March 20, 1956 H. F. FLOWERS 2,738,733
DUMP CAR VALVE CONTROL MECHANISM
Filed April 1, 1952 3 Sheets-Sheet 1
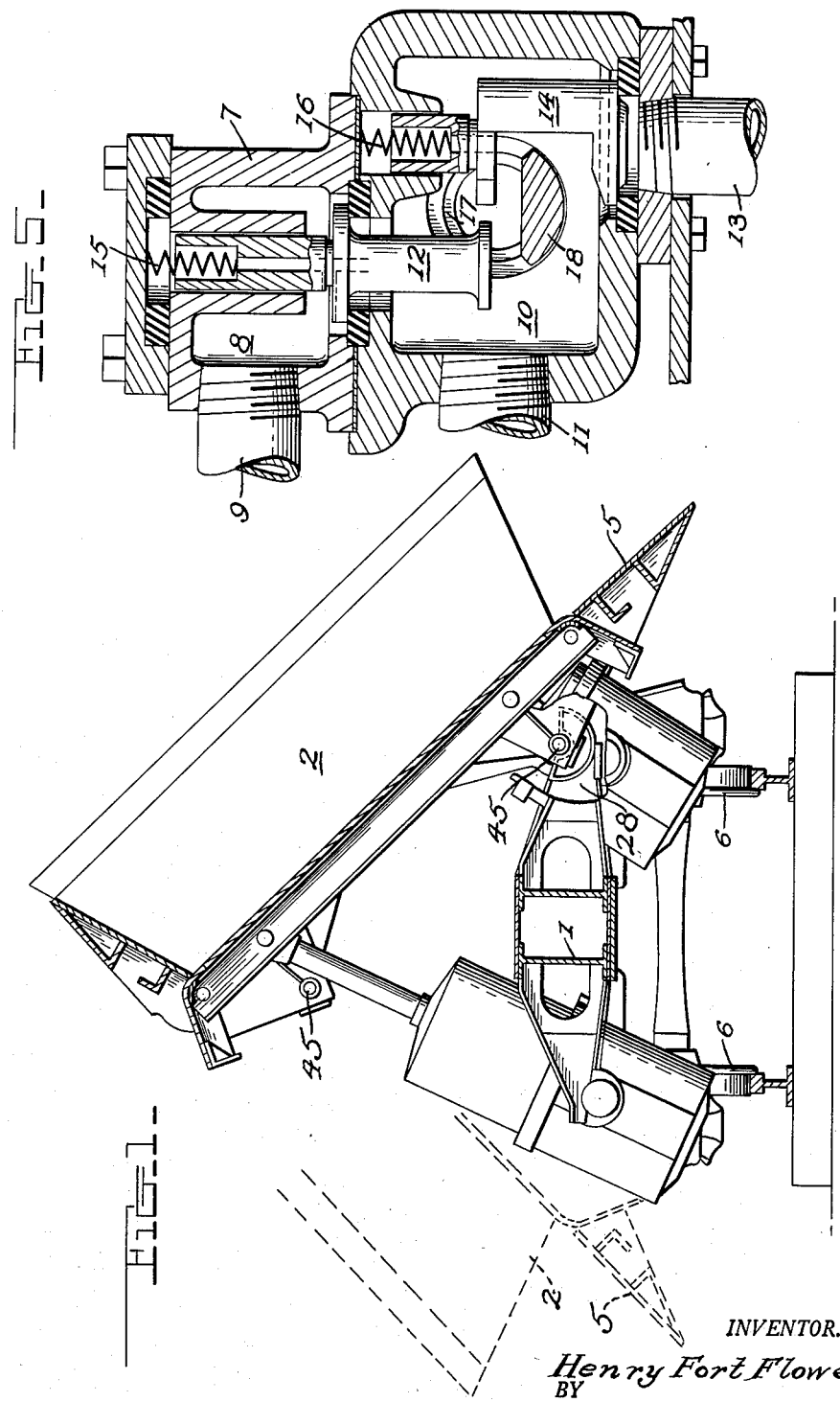
INVENTOR.
Henry Fort Flowers
BY
Mason, Porter, Diller + Stewart
attys.

March 20, 1956 H. F. FLOWERS 2,738,733
DUMP CAR VALVE CONTROL MECHANISM
Filed April 1, 1952 3 Sheets-Sheet 2
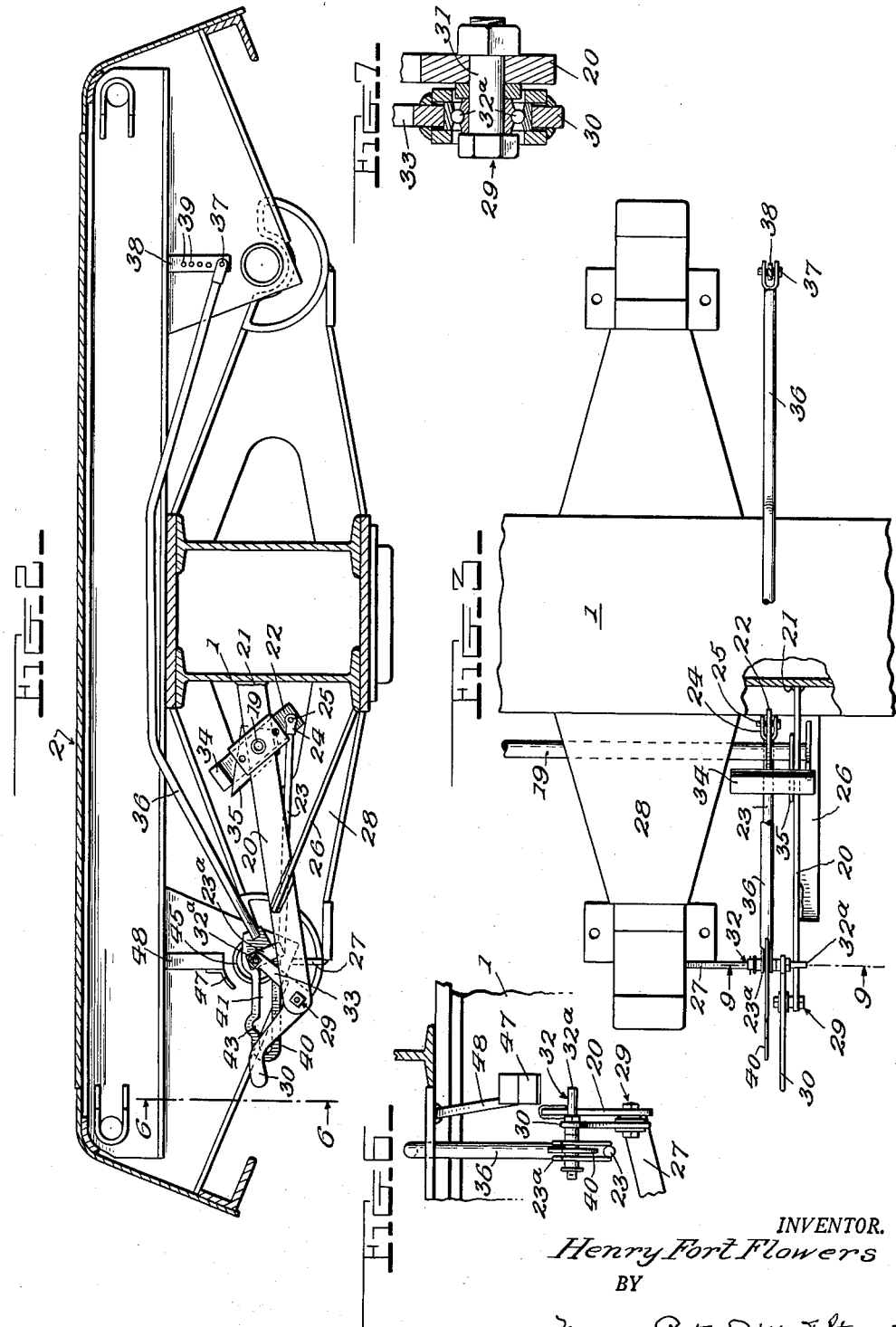
INVENTOR.
Henry Fort Flowers
BY
Mason, Porter, Diller & Stewart
attys.

March 20, 1956 H. F. FLOWERS 2,738,733
DUMP CAR VALVE CONTROL MECHANISM
Filed April 1, 1952 3 Sheets-Sheet 3
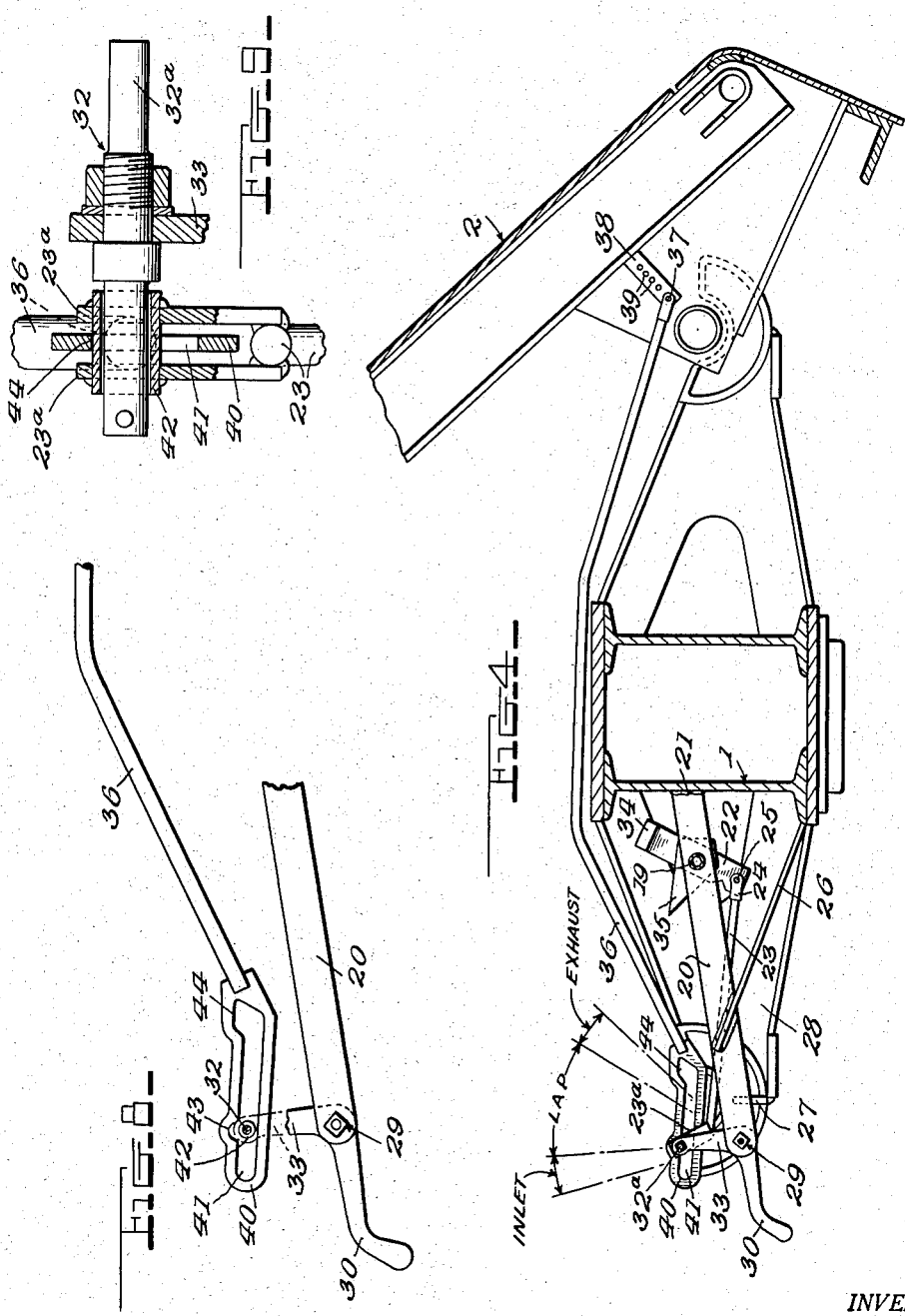
INVENTOR.
*Henry Fort Flowers*
BY
*Mason, Porter, Diller & Stewart*
attys.

United States Patent Office 2,738,733
Patented Mar. 20, 1956

2,738,733

DUMP CAR VALVE CONTROL MECHANISM

Henry Fort Flowers, Findlay, Ohio

Application April 1, 1952, Serial No. 279,896

12 Claims. (Cl. 105—273)

The invention relates to new and useful improvements in a two-way air dump car of the type shown in my prior U. S. Patent No. 1,972,042, granted August 28, 1934, and more particularly to the dump car valve control mechanism which controls air supply for operating the hoisting cylinders for tilting the car body to dumping position.

An object of the invention is to provide a valve control mechanism for an air dump car of the above type which may be operated to cut off the air supply to the dump car hoisting cylinders when the body is tilted to a predetermined angle during dumping.

A further object of the invention is to provide a valve control mechanism with simple adjusting means for varying the body dumping angle at which the air cut-off takes place.

A further object of the invention is to provide a valve control mechanism for a two-way dump car which is so arranged that when the body is tilted in one direction for dumping it is impossible to actuate the control mechanism used to tip the body in the opposite direction.

A still further object of the invention is to provide a valve control mechanism which is so arranged underneath the body of the car that it is well protected from damage and at the same time readily acessible for operation and maintenance.

These and further objects will in part be obvious and will in part be hereinafter more fully disclosed.

In the drawings, which show by way of illustration, one embodiment of the invention:

Figure 1 is a view showing more or less diagrammatically a two-way dump body with the body tilted on fulcrums at one side thereof for dumping;

Figure 2 is a transverse section of a dump car showing a portion of the body, a portion of the underframe, and that part of the valve control assembly for dumping the car to one side;

Figure 3 is a plan view from a portion of the underframe and the valve controlling assembly shown in Figure 2;

Figure 4 is a view similar to Figure 1 with the car body tilted to the maximum dumping angle;

Figure 5 is a sectional view showing a three-way valve for controlling the supply of air to the hoisting cylinder, and for controlling the exhaust of air from said cylinder;

Figure 6 is a sectional view on the line 6—6 of Figure 2, showing an end view of the valve controlling mechanism;

Figure 7 is a sectional view showing the manner of mounting the control handle on its pivotal support; and Figure 8 is a detail view showing in side view the down operating handle and the slide for automatically shifting the same when the body has been tilted to a predetermined angle.

Figure 9 is a section on the line 9—9 of Figure 3 showing the operating pin and its connection to the handle, the valve operating rod and the control slide.

Referring to Figure 1 the dump car to which the improvement has been applied includes an underframe having a center sill 1, bolsters projecting laterally therefrom on which a body 2 is mounted so that it may be selectively tilted to one side or the other for dumping. There is a pair of hoisting cylinders 3 at one side of the center sill which are used for hoisting the right hand side of the car as shown in Figure 1. There are similar hoisting cylinders 4 connected to the body for tilting it in the opposite direction. The body has a door 5 at each side thereof which is automatically opened when the body is tilted. The underframe supporting the body is mounted on trucks including wheels 6—6. This is the type of dump car illustrated in my prior Patent No. 1,972,042 and further description thereof is not thought necessary.

The dump car is equipped with an air supply reservoir in which air is retained under pressure. There is a three-way valve which may be manually operated to supply air to the hoisting cylinder for tilting the body for dumping and the valve when manually shifted will connect the cylinder with the exhaust permitting the body to return to normal transporting position. The valve has what might be called a lap position in which the air supply is cut off and likewise the exhaust so that the cylinder is closed both to the inlet and the exhaust.

In Figure 5 there is shown a three-way valve unit which may be used for supplying air to the cylinders, connecting the cylinders to the exhaust, and for closing both the inlet and the exhaust.

This valve unit is shown, described and claimed in my copending application Ser. No. 196,827, filed November 21, 1950, and, therefore, no claim per se is made to the valve herein.

There is, of course, a valve unit associated with the hoisting cylinders at each side of the car and a separate control mechanism for each valve unit. The valve unit includes a housing 7 having a chamber 8 connected by a pipe 9 to the source of supply of air under pressure. The valve housing also has a chamber 10 to which a pipe 11 is connected and this pipe is in turn connected to the hoisting cylinders. There is a valve 12, which when open connects the chamber 8 with the chamber 10. When the valve is open air will be supplied under pressure to the hoisting cylinders associated therewith for tilting the body to a dumping position. When the valve is closed then the air supply is cut off. There is also a pipe 13 connected to the chamber 10 and a valve 14 which closes the connection between the chamber 10 and the pipe 13. When the valve is open then the air in the cylinders may exhaust through the pipe 11 to the chamber 10 and thence to the exhaust pipe 13. There is a spring 15 for closing the valve 12 and a spring 16 for closing the valve 14. There is a stub shaft 17 mounted in the housing and this stub shaft carries a projecting segment 18. When the shaft is turned in a clockwise direction this segment will contact the valve 12 and open the same and when the shaft is turned in a counter-clockwise direction the segment will contact the valve 14 and open the same. When the stub shaft is in the position shown in Figure 5 it is out of contact with the valves and this is what might be called the lap position in that the valves are both closed shutting off any air inlet of the cylinder or any exhaust therefrom.

Connected to the stub shaft 17 of the three-way valve is a tubular shaft 19. This tubular shaft extends along the underframe and at its outer end the shaft is journaled in a bracket 20 welded at 21 to one of the side webs of the center sill 1. Mounted on the shaft 19 is a crank arm in the form of a plate 22. A link 23 is provided with a yoke 24 which straddles the plate and is connected to a pivot pin 25 carried thereby.

The bracket 20 is further supported by a plate 26 which is welded to the bracket and welded to the base of the web of the center sill 1. There is also a plate 27 which is welded to the bolster 28 carried by the center sill and at its outer end it is welded to the bracket 20. Adjacent the extreme outer end of this bracket 20 is a pivotal support 29 for a handle 30. As shown in Figure 7 the handle 30 is mounted on a pivot stud 31 and between the handle and the pivot stud is a ball bearing 32ª. This pivot stud is clamped to the bracket arm and the handle may be swung freely on the pivot pin. The link 23 connected to the crank arm 22 on the shaft 19 carries a yoke 23ª at its outer end and this yoke is connected to a pin 32 fixed to the outer end of the arm 33 which is integral with and forms a part of the handle 30. When the handle is swung in a clockwise direction it will, through the link 23, turn the shaft 19 in a counterclockwise direction and when this handle is swung in the opposite direction then it will turn the shaft 19 in the opposite direction.

As shown in Figure 4, the arc of rotation of the control handle 30 is divided into three valve positions, namely inlet, a position in which the high pressure air enters the cylinders; lap, an intermediate position in which the air can neither enter nor leave the cylinders; and exhaust, in which the cylinders are connected to the atmosphere. In Figure 4, the handle is shown positioned so that the valve is just passing from inlet to lap position and in Figure 2 the handle has been lifted and the valve shifted to the exhaust position. In the inlet position the valve 12 has been raised to open position and in the exhaust position the valve 12 is closed and the valve 14 has been lifted to open position. During the lap the segment 18 is out of contact with either valve and the springs close the valves so that both valves are closed. The plate 22 on the shaft 19 is extended and carries a weight 34 which is so positioned that the handle when released will be moved to exhaust position. There is a stop plate 35 welded to the bracket 20 and this stop plate limits the movement of the weight 34.

For a maximum smoothness of dumping and minimum air consumption, it is desirable to leave the control valve in the inlet position no longer than necessary to insure that the body will be tilted so as to dump the load. An experienced operator will shift the valve handle 30 from inlet position to lap position and let the dumping proceed, the body rising to the full dumping angle by expansion of air in the hoisting cylinders as the material in the body slides off the car floor and the open door. An inexperienced operator, however, is likely to leave the control handle 30 in inlet position much too long, wasting air and causing the load to be dumped with such rapidity that the shock may even result in derailment of the car.

The present invention has to do with a valve control mechanism which acts to cut off the inlet air supply to the air dump car hoisting cylinders when the body is tilted to a predetermined angle in the dumping operation. The cut off mechanism includes a rod 36. This rod extends from the side of the car on which the handle is located to the opposite side of the car where it is connected by a pivot pin 37 to a bracket 38 fixed to the bottom plate of the car body. This bracket plate has a series of openings 39 and the pivot pin 37 may be shifted from one opening to another. At the other end of the rod 36 is a control slide 40. This control slide has a slot 41 extending from one end of the slide to the other where it is connected to the rod 36. On the pin 32 joining the arm of the crank handle 30 to the operating link 23 is a sleeve 42. The yoke members 23ª are welded to this sleeve which is freely mounted on the pin 32. The control slide lies between these yoke members 23ª and the sleeve and pin pass through the slot 41 in said control slide. (See Fig. 9.)

When the car body moves from the position shown in Figure 2 to full dumping position shown in Figure 4 the rod 36 being pivoted at 37 which is eccentric to the fulcrum for the car body will move to the right, said slide moving along the pin 32 and when the car body swings back after dumping to the position where it rests on the fulcrums at the opposite sides of the underframe, the slide will move to the left.

In the upper side of the slot 41 there is a notch 43 which will be referred to as the cut-off notch. At the other end of the slot from the cut-off notch is the notch 44 which will be referred to as the exhaust notch. When the car body is in normal position resting on both fulcrums the pin 32 which has shifted the link 23 so as to connect the hoisting cylinders to the exhaust will be opposite the notch 44 and the notch will drop down over the sleeve 42. When it is desired to shift the body from the position shown in Figure 2 to the position shown in Figure 4 for dumping the contents of the body the operator grasps the handle 30 and forces it downwardly to inlet position. The control handle pin 32 is located in the slot 41 intermediate the exhaust notch 44 and the cut-off notch 43. This permits air under pressure to enter the cylinders and the body will begin to tilt. As the body rises the cut-off control slide 40 moves to the right. When the body reaches a chosen cut-off angle the cut-off notch 43 drops over the pin on the control handle. When the body rises further the control handle is carried by the cut-off notch 43 to lap position and no further air enters the dumping cylinders. If the car body is empty it will stop rising when air to the cylinders is cut off. If the body is loaded, however, material will continue to spill out of the body after the air is cut off and expansion of the air in the cylinders will carry the body to full dumped position. The cut-off control slide 40 continues to move to the right, though not so far as to carry the control handle 30 all the way through the lap position.

The body will remain in dumped position until the operator forcibly returns the control handle 30 to exhaust position, moving the control handle operating pin 32 from under the cut-off notch 43 to a position in the slot intermediate the cut-off notch 43 and the exhaust notch 44. The three-way valve remains in exhaust position. Air exhausts from the dumping cylinders through the three-way valve and the body returns to central position. When the body returns to central position the cut-off control slide 40 moves to the left and as the body comes to rest the exhaust notch 44 drops over the control handle operating pin acting to hold the control handle 30 in exhaust position. The operator need only to move the control handle 30 to inlet position to dump the car body and move the control valve to exhaust position to return the body to carrying position. The control mechanism will automatically cut off the air at the predetermined angle. This predetermined angle can be changed by shifting the pin 37 to one of the other openings 39 in the bracket 38. The operator can, of course, override the cut-off mechanism at any time as the entrance to the notches have the corners sloped enough so that the restraining effect of the notches may be overcome. The notches are cut sufficiently deep, however, so that appreciable force on the control handle is required to either initiate the dumping cycle by proceeding from exhaust position to inlet position or to proceed from lap position to exhaust position when the body 4 is in full dumped position.

It should be noted that when the contol handle 30 is in exhaust position as indicated in Figure 2, the axis of the control handle operating pin 32 is identical with the axis of the trunnion 45 when said trunnion is in the fulcrum pocket of the body supporting bolster 28. This is important, otherwise, the dumping of the car in one direction using one set of controls would result in unwanted rotation of the control handle 30 in the other set of controls.

Sometimes when a car is dumped in one direction it fails to return, usually because of a load on the door on the dumped side. An inexperienced operator is likely to try and right the body by introducing air into the cylinders on the opposite side of the car which would cause damage to the car. To prevent this an interlock 47 is attached to the car body as shown in Figure 2. This interlock is carried by a bracket 48 mounted on the underframe of the car. Attached to the lower end of the bracket is a plate and this plate lies in the path of the movement of the extension 32ª of the pin 32. A movement of the handle 30 to move the control pin 32 to inlet position will bring said extension of the pin into contact with the plate and prevent movement of the same to inlet position. In other words, it would be impossible to operate the control handle 30 to inlet position when the car has been tilted to dumping position at the side of the car where the control handle is located. This dumping movement of the car was controlled by the control mechanism at the right of the car.

Only one set of controls has been shown in the drawings. This is the control at the left of the car as viewed in Figures 1 and 2 for controlling the dumping of the contents to the right as viewed in said figure. There is another set of controls at the other side of the car for dumping the car to the left. Both sets of controls are in well protected position underneath the floor of the body and yet are quite accessible for operation and maintenance.

It will be understood that many changes in the details of construction and arrangement of parts may be made without departing from the spirit of the invention as set forth in the appended claims.

I claim:

1. A two-way air dump car comprising an underframe, a body mounted thereon for tilting about fulcrums at opposite sides of the underframe for dumping, hoisting cylinders disposed on the side of the underframe opposite the fulcrums for selectively tilting said body, a separate manually operated valve associated with said cylinders at each side of the underframe for connecting said cylinders to an air pressure supply, to exhaust, and for closing the supply and exhaust, and means connected to the body adjacent the fulcrum at the dumping side for automatically shifting the manually operative valve associated with the cylinders tilting the body for closing the air supply to said hoisting cylinders when the body has been tilted thereby to a predetermined degree.

2. An air dump car comprising an underframe, a body mounted thereon for tilting about fulcrums for dumping, hoisting cylinders for tilting the body, a manually operated valve for connecting said cylinders to an air pressure supply, to exhaust, and for closing the supply and exhaust, and means connected to the body adjacent the fulcrum on which the body is tilted for shifting the valve to a position for closing both the air supply and the exhaust when the body has been tilted to a predetermined degree.

3. An air dump car comprising an underframe, a body mounted thereon for tilting about fulcrums for dumping, hoisting cylinders for tilting the body, a manually operated valve for connecting said cylinders to an air pressure supply, to exahust, and for closing the supply and exhaust, means connected to the body adjacent the fulcrum on which the body is tilted for shifting the valve to a position for closing both the air supply and the exhaust when the body has been tilted to a predetermined degree, and means whereby the connection to the body may be shifted for varying the angle to which the body is tilted before the air supply is cut off.

4. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a handle connected to said shaft for shifting the valve to inlet, lap and exhaust positions, said handle being located on the side opposite dumping and means connected to the body adjacent the fulcrum on which the body is tilted for shifting the valve to a position for closing both the air supply and the exhaust when the body has been tilted to a predetermined degree.

5. An air dump car comprising an underframe, a body mounted thereon for tilting about fulcrums for dumping, hoisting cylinders for tilting the body, a valve connecting the cylinders to an air supply to exhaust, and for closing the supply and exhaust, a shaft for operating the valve, a handle connected to said shaft for shifting the valve to inlet, lap and exhaust positions, said handle being located on the side opposite dumping, a rod connected to said body adjacent the fulcrum line on which the body tilts and operatively connected to said handle for shifting the valve to lap position when the body has been tilted to a predetermined angle.

6. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted to said bracket and a link connecting the handle to the crank arm said handle being located on the side opposite dumping, a rod connected to the body adjacent the fulcrum line on which the body tilts and operatively connected to said handle for shifting the valve to lapped position when the body has been tilted to a predetermined angle.

7. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted intermediate the ends thereof, an operating pin carried at the inner end of said handle and a link connecting said pin to said crank arm said handle being located on the side opposite dumping, a rod connected to the body adjacent the fulcrum line on which the body tilts and operatively connected to said handle for shifting the valve to lapped position when the body has been tilted to a predetermined angle.

8. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted intermediate the ends thereof, an operating pin carried at the inner end of said handle and a link connecting said pin to said crank arm, a weight eccentrically connected to said shaft and adapted to return the handle when released to exhaust position said handle being located on the side opposite dumping, a rod connected to said body adjacent the fulcrum line on which the body tilts and operatively connected to said handle for shifting the valve to lapped position when the body has been tilted to a predetermined angle.

9. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted intermediate the ends thereof, an operating pin carried at the inner end of said handle and a link connecting said pin to said crank arm, a rod connected to said body adjacent the fulcrum line on which the body tilts and a slide connected to said rod and having a slot in which said pin rides as the body is tilted, said slot having a notch adapted to engage the pin and move the handle to lap position when the body has been tilted to a predetermined angle.

10. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted intermediate the ends thereof, an operating pin carried at the inner end of said handle and a link connecting said pin to said crank arm, a rod connected to said body adjacent the fulcrum line on which the body tilts and a slide connected to said rod and having a slot in which said pin rides as the body is tilted, said slot having a notch adapted to engage the pin and move the handle to lap position when the body has been tilted to a predetermined angle, said slide having a second notch adapted to engage said pin and yieldably hold the handle in its exhaust position when the body is in centered position.

11. An air dump car comprising an underframe, a body mounted thereon for tilting about fulcrums for dumping, hoisting cylinders for tilting the body, a valve connecting the cylinders to an air supply, to exhaust, and for closing the supply and exhaust, a shaft for operating the valve, a crank arm on said shaft, a bracket carried by the underframe in which said shaft is journaled, a handle pivoted intermediate the ends thereof, an operating pin carried at the inner end of said handle and a link connecting said pin to said crank arm, a bracket attached to said body adjacent the fulcrum on which the body is tilted, a rod pivotally connected to said bracket eccentrically of the fulcrum line and a slide connected to said rod and having a slot in which said pin slides as the body is tilted, said slot having a notch adapted to engage the pin and move the handle to lap position when the body has been tilted to a predetermined angle.

12. A two-way air dump car comprising an underframe, a body mounted thereon for tilting about fulcrums at opposite sides of the underframe for dumping, hoisting cylinders disposed on the side of the underframe opposite the fulcrums for selectively tilting the body, separate manually controlled means associated with the cylinders at each side of the underframe for connecting the cylinders with which they are associated to the air pressure supply, to exhaust, and closing the supply and exhaust, and means associated with each control means and shifted with the body as it tilts about fulcrums at one side of the underframe so as to prevent operation of the control means for tilting the body about fulcrums at the opposite side of the underframe.

References Cited in the file of this patent
UNITED STATES PATENTS

| | | |
|---|---|---|
| 493,317 | Trapp | Mar. 14, 1893 |
| 571,058 | Trapp | Nov. 10, 1896 |
| 1,711,211 | Schmohl et al. | Apr. 30, 1929 |
| 2,588,133 | Lunde | Mar. 4, 1952 |